(12) United States Patent
Papania et al.

(10) Patent No.: US 8,561,772 B2
(45) Date of Patent: Oct. 22, 2013

(54) ROLLER, SPRAG OR RATCHET ONE-WAY CLUTCH WITH TWO BACKING PLATES

(75) Inventors: James R. Papania, Bolingbrook, IL (US); Craig S. Larson, Schaumburg, IL (US); Douglas J. Slager, Wheaton, IL (US)

(73) Assignee: BorgWarner Inc., Auburn Hills, MI (US)

( * ) Notice: Subject to any disclaimer, the term of this patent is extended or adjusted under 35 U.S.C. 154(b) by 763 days.

(21) Appl. No.: 12/305,994

(22) PCT Filed: Jul. 6, 2007

(86) PCT No.: PCT/US2007/015521
§ 371 (c)(1),
(2), (4) Date: Dec. 22, 2008

(87) PCT Pub. No.: WO2008/008268
PCT Pub. Date: Jan. 17, 2008

(65) Prior Publication Data
US 2009/0277738 A1    Nov. 12, 2009

Related U.S. Application Data

(60) Provisional application No. 60/819,238, filed on Jul. 7, 2006.

(51) Int. Cl.
*F16D 47/00* (2006.01)
*F16D 41/04* (2006.01)
(52) U.S. Cl.
USPC ...................... 192/48.3; 192/48.92

(58) Field of Classification Search
USPC ................ 192/48.3, 48.92, 48.618, 45
See application file for complete search history.

(56) References Cited

U.S. PATENT DOCUMENTS

| | | | | |
|---|---|---|---|---|
| 4,225,029 A * | 9/1980 | Ushijima | ................... | 192/12 C |
| 4,380,179 A | 4/1983 | Kubo et al. | | |
| 4,782,931 A * | 11/1988 | Lederman | ................. | 192/70.12 |
| 4,805,752 A * | 2/1989 | Malloy et al. | ............... | 192/85.42 |
| 5,267,917 A * | 12/1993 | Kadotani et al. | ............. | 475/318 |
| 5,511,642 A * | 4/1996 | Klotz et al. | ............. | 192/45.004 |
| 5,715,918 A * | 2/1998 | Everett et al. | ............. | 192/48.92 |
| 6,125,979 A * | 10/2000 | Costin et al. | .................... | 192/46 |
| 6,227,340 B1 * | 5/2001 | Braford, Jr. | .................. | 192/48.7 |
| 6,332,520 B1 * | 12/2001 | Costin | ............................. | 192/46 |
| 6,468,177 B2 * | 10/2002 | Park | ............................. | 475/271 |
| 7,000,749 B2 * | 2/2006 | Yamada et al. | ................. | 192/46 |
| 7,100,755 B2 * | 9/2006 | Takasu | ......................... | 192/45.1 |
| 2002/0029947 A1 * | 3/2002 | Imamura | ..................... | 192/48.5 |
| 2003/0051963 A1 * | 3/2003 | Ohishi | ......................... | 192/45.1 |
| 2004/0053724 A1 | 3/2004 | Biermann et al. | | |
| 2005/0279602 A1 | 12/2005 | Ruth | | |
| 2006/0124425 A1 * | 6/2006 | Fetting et al. | ................ | 192/48.3 |
| 2007/0272503 A1 * | 11/2007 | Kigawa et al. | ................ | 188/156 |
| 2007/0272508 A1 * | 11/2007 | Toya et al. | ................... | 192/48.3 |

* cited by examiner

*Primary Examiner* — Ha D Ho
*Assistant Examiner* — Jude Agendia
(74) *Attorney, Agent, or Firm* — Warn Partners, P.C.

(57) ABSTRACT

A one-way clutch is provided that includes a first race, a second race having relative rotational movement with the first race, a locking mechanism to allow relative rotational movement between the races in one direction only and first and second backing plates connected with the first race.

8 Claims, 4 Drawing Sheets

ROLLER, SPRAG OR RATCHET ONE-WAY CLUTCH WITH TWO BACKING PLATES

FIELD OF THE INVENTION

The present invention relates to one-way clutches especially one-way clutches and automotive transmissions which utilize the same.

BACKGROUND OF THE INVENTION

One-way clutches are often used in automotive transmissions. Typically the one-way clutch will be installed within a transmission casing axially juxtaposing lateral individually installed backing plates. The backing plates serve as stops for adjacent outboard friction packs. It is desirable to provide a one-way clutch which incorporates both backing plates so that its assembly into the transmission can be simplified and so that stringent dimensional tolerances of the transmission assembly can be more easily met. Additionally, in front wheel drive vehicles with a transverse mounted engine, it is desirable that the length of the transmission be as short as possible.

SUMMARY OF THE INVENTION

To make manifest the above noted and other desires, a revelation of the present invention is brought forth. The present invention provides a one-way clutch comprising that include a first race and a second race having relative rotational movement with the first race. A locking mechanism is provided to allow relative rotational movement between the races in one direction only. First and second backing places are connected with the first race. Accordingly, installation of the one way clutch also installs a backing plate required for two friction packs at the same time.

Other features of the invention will become more apparent to those skilled in the art as the invention is further revealed in the accompanying drawings and Detailed Description of the Invention.

DETAILED DESCRIPTION OF THE INVENTION

Figure 1:
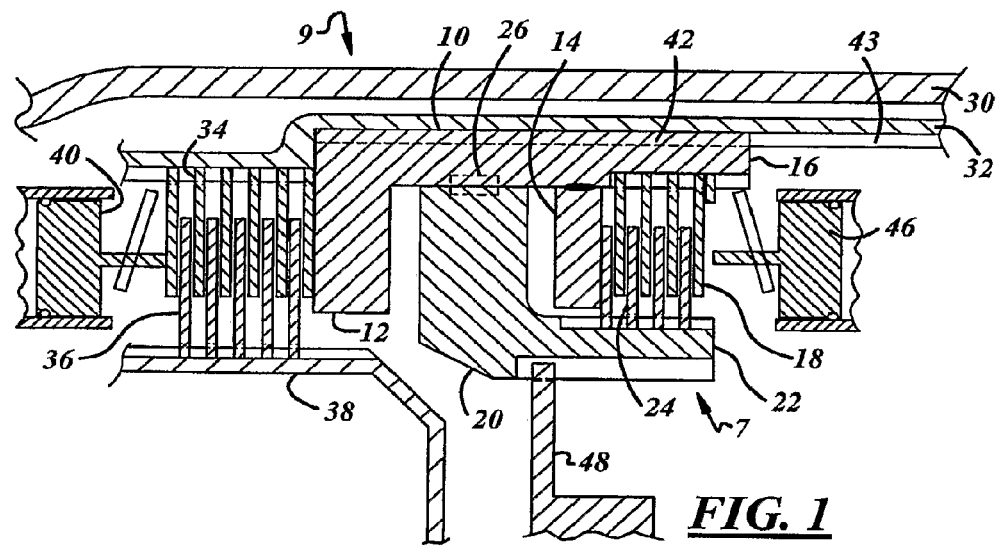
FIG. 1 is a partial sectional view of a preferred embodiment one-way clutch of the present invention shown in the environment of a transmission arrangement.

Referring to FIG. 1 a one-way clutch 7 is shown incorporated in the environment of a planetary gear type automatic transmission 9. The clutch 7 includes an outer race 10. The outer race 10 has an integral first backing plate 12. The outer race 10 also has a fixedly connected second backing plate 14. The backing plate 14 may be connected to the outer race 10 by an adhesive, welding, bonding rivets, bolts, screws, an interference fit, cutting serrations or swedging. Connected with the outer race 10 on a side opposite the backing plate 12 is an integral friction pack drum 16. The friction pack drum 16 is integral with the outer race 10. Torsionally connected to the friction pack drum 16 is a series of annular axially movable separator plates 18.

Mounted for unidirectional movement with respect to the outer race 10 is an inner race 20. The inner race 20 has an integral friction pack spline 22. The friction pack spline 22 is torsionally connected with a series of annular friction members provided by friction discs 24. The friction discs 24 juxtapose the separator plates 18.

A locking mechanism 26 is provided to allow only unidirectional relative rotational movement between the inner race 20 and outer race 10. The locking mechanism 26 can be a sprag type, roller type, ratchet type, or other suitable locking mechanism.

The transmission 9 has a cast casing 30. The casing 30 has a machined non-rotative liner 32. The liner 32 provides an interior boundary and has a spline portion torsionally connected with a first set or series of axially movable friction members or separator plates 34. The separator plates 34 are generally adjacent the first backing plate 12. The separator plates 34 are juxtaposed by friction discs 36. The discs 36 are torsionally connected to a gear housing 38. A piston actuator 40 is provided that is fixed to the casing 30. Activation of the piston actuator 40 causes the friction pack of the separator plates 34 and discs 36 to lock up against the backing plate 12 thereby locking the gear housing 38 with the case 30. The first race 10 on its circumference surface has a series of serrations 42 which torsionally locked the outer race 10 with serrations 43 of the transmission casing liner 32. The locking of the gear housing 38 with the casing 30 is part of the gear selection process of the transmission 9. In a similar manner a piston actuator 46 fixed with respect to the liner 32 is provided to selectively engage the friction pack of a second set of axially movable friction members or plates 18 and a set of axially movable friction members or discs 24 against the adjacent backing plate 14 to lock the inner race 20 with the casing 30. The locking the inner race 20 prevents rotation of the cage arm 48, thereby participating in the gear selection process of the transmission 9. Installation of the one way clutch 7 into the transmission arrangement 9 simultaneously installs the positionally adjacent backing plate 12 for the friction pack formed by separator plates 34 and disc 36. Installation of the one way clutch 7 into the transmission arrangement 9 also simultaneously installs the friction pack formed by the separator plates 18 and the discs 24 and its associated backing plate 14.

Figure 2:
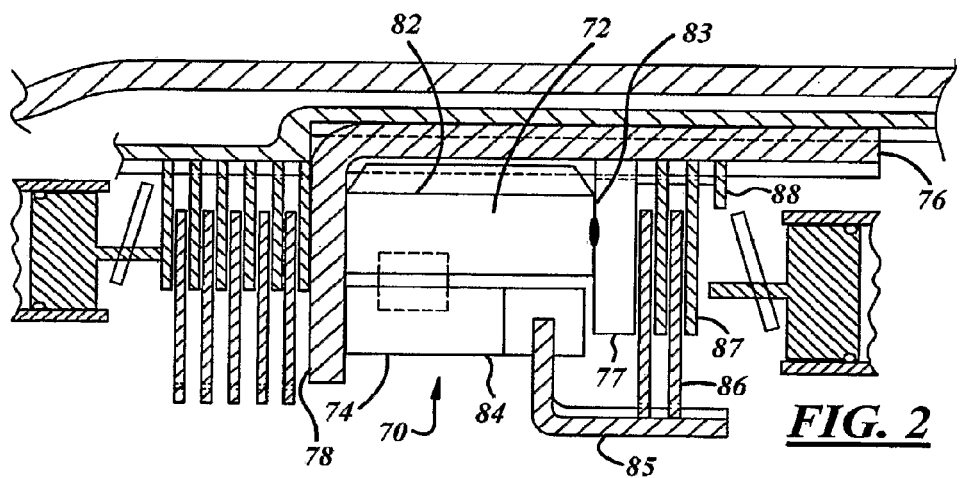
FIG. 2 is a view similar to that of FIG. 1 of an alternative embodiment one-way clutch of the present invention.

Referring to FIG. 2, one-way clutch 70 has an outer race 72 and an inner race 74. The friction pack drum 76 and the backing plate 78 are integrally formed from a stamping. The outer race 72 can be fitted within friction pack drum 76 stamping by a press fit or other type of interference fit. The outer race 72 can also be splined to the friction pack drum 76. A plate 77 is connected with an outer race housing 82 to supply a backing plate. Alternatively the housing side 83 can be strengthened to provide a backing plate. One way clutch 70, friction pack drums 76 and 85, axially movable friction members 86 and 87 can be installed within the liner 32 as a single unit due to the retainer clip 88.

Figure 3:
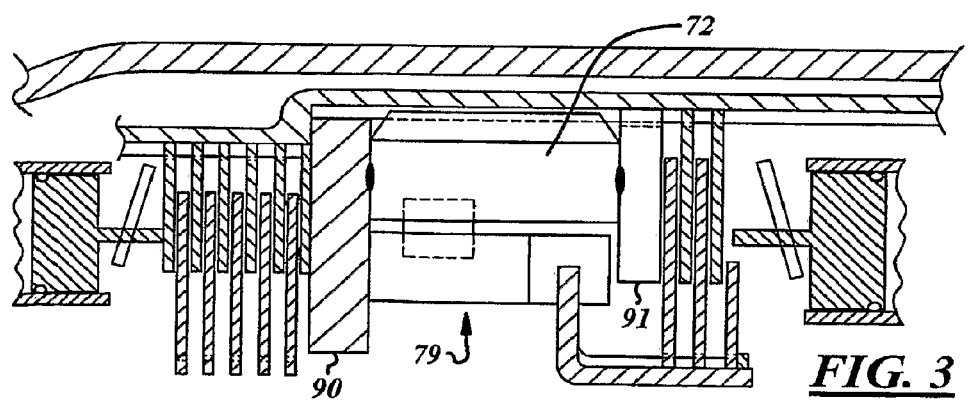
FIG. 3 is a view similar to that of FIG. 1 of still another alternative embodiment one-way clutch of the present invention.

One way clutch 79 (FIG. 3) is similar to one way clutch 70. Both backing plates are connected with the outer race 72. The outer race 72 is directly splined or interference fitted with the liner 32. The liner 32 functions as one of the friction pack drums.

Figure 4:
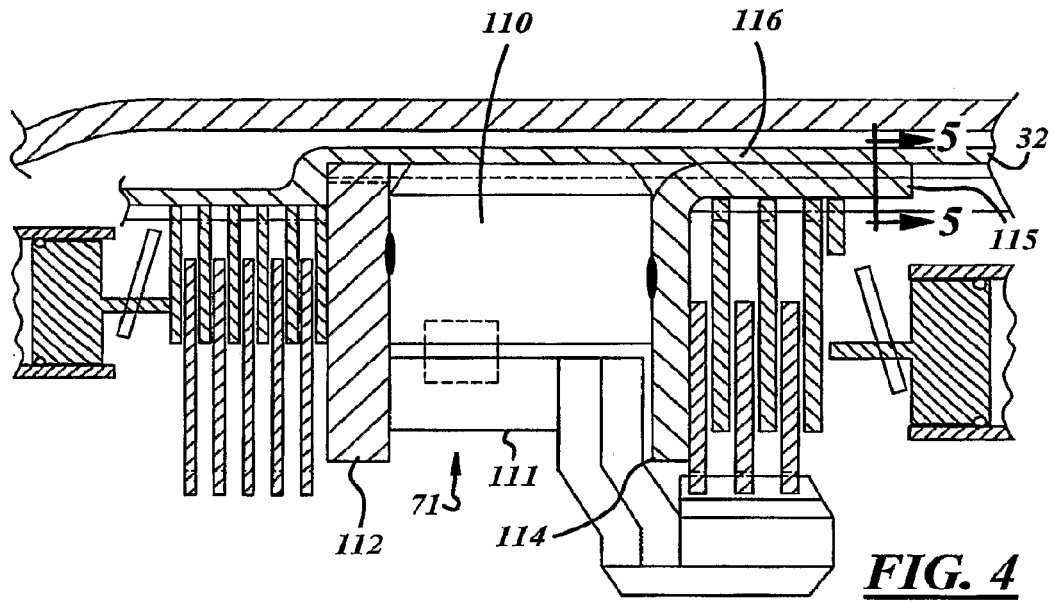
FIG. 4 is a view similar to FIG. 1 of still another alternative embodiment one-way clutch according to the present invention.
Figure 5:
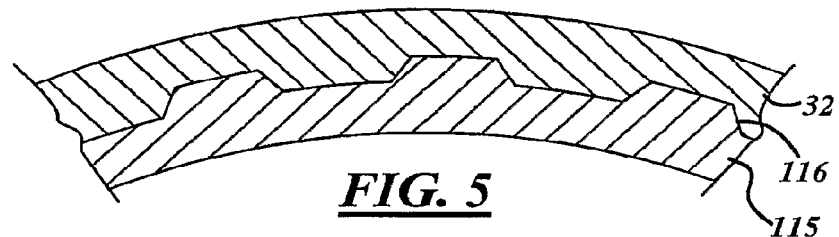
FIG. 5 is sectional view taken along line 5-5 of FIG. 4.

Referring to FIGS. 4 and 5 a one-way clutch 71 has an outer race 110 and the inner race 111. Connected by welding or by faster to the outer race 110 is a backing plate 112. A backing plate 114 in like manner is connected to the outer race 110. The backing plate 114 is on a common side of the inner race 110 with the friction pack drum 115. The backing plate 114 is integral with the friction pack drum 115. Friction pack drum 115 on an outer surface having serrations 116 to allow it to be non-rotatively mounted with a transmission casing.

Figure 8:
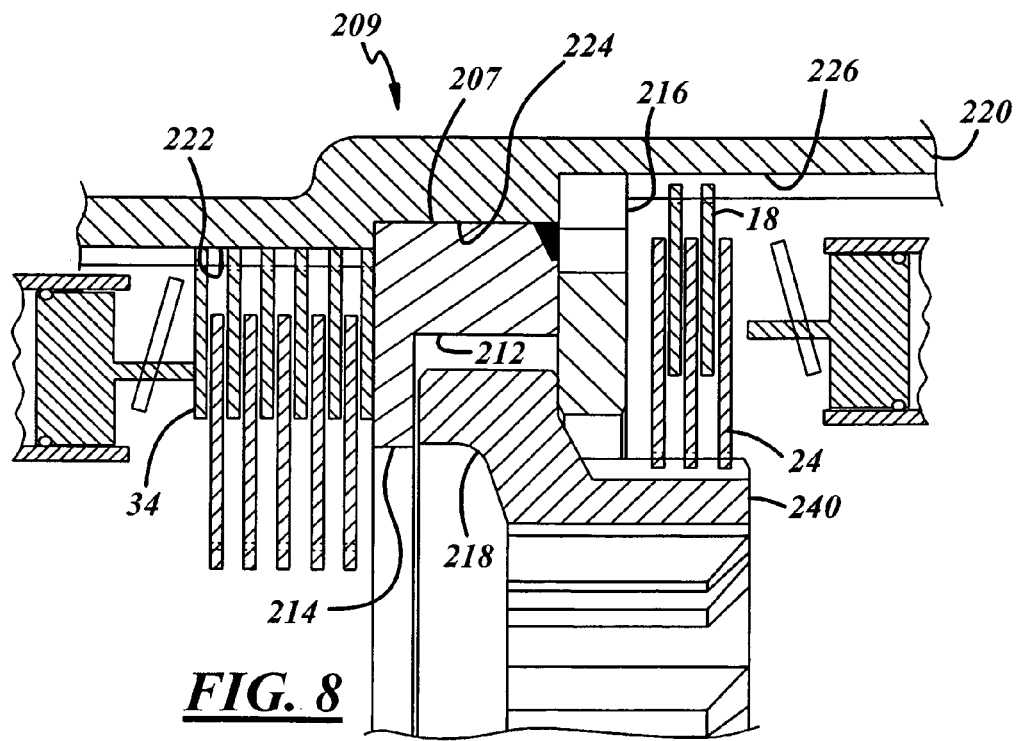
FIG. 8 is a view similar to that of FIG. 1 of still another alternative embodiment one-way clutch according to the present invention.
Figure 9:
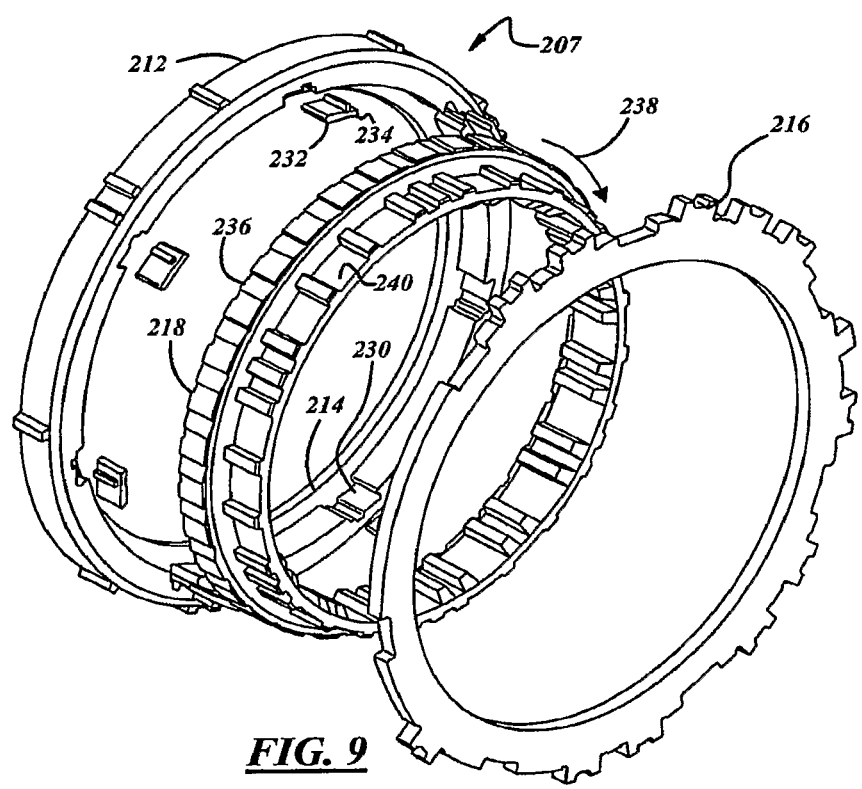
FIG. 9 is an exploded view of the one-way clutch shown in FIG. 8.

Referring to FIGS. 8 and 9, the transmission arrangement 209 is provided having a one way clutch according to the present invention 207. One way clutch 207 has a first race 212 with an integral first backing plate 214. Connected by brazing to the first race 207 is a second backing plate 216. It is apparent to those skilled in the art that the second backing plate 216 will be joined to the outer race 212 only after the inner second race 218 has been assembled to the outer race 212. In the transmission arrangement 9 shown in FIG. 1, the annular axially movable friction members 34 and 18 have an outer diameter which is less than the outer diameter of the outer race 10. In the transmission arrangement 209, the transmission liner 220 provides an interior boundary with an increasing shoulder first interior diameter 222, a second larger interior diameter 224 and a third still larger interior diameter 226. Accordingly, the outer diameter of the friction disc 34 extending toward diameter 222 is less than the outer diameter of the first backing plate 214 or the first race 212 and both of these diameters are less than the outer diameter of the discs 18. Discs 18 extend toward the greater third diameter 226 of the interior or of the second friction facing 216. The outer race 212 has a series of valleys or depressions 230 which pivotally mount ratchet pawl members 232. Ratchet pawl members 232 have a locking edge 234 for engagement with ratchet surface 236 of the inner race 218 to prevent the inner race 218 from rotating any direction other than that of direction 238 as shown in FIG. 9 to provide the inner race 218 with unidirectional relative rotation with respect to the outer race 212. The second race has a friction pack spline 240 for mounting of friction disc 24. A retainer clip (not shown) can be utilized to retain the friction pack together formed by the separator plate 18 and friction disc 24.

Figure 6:
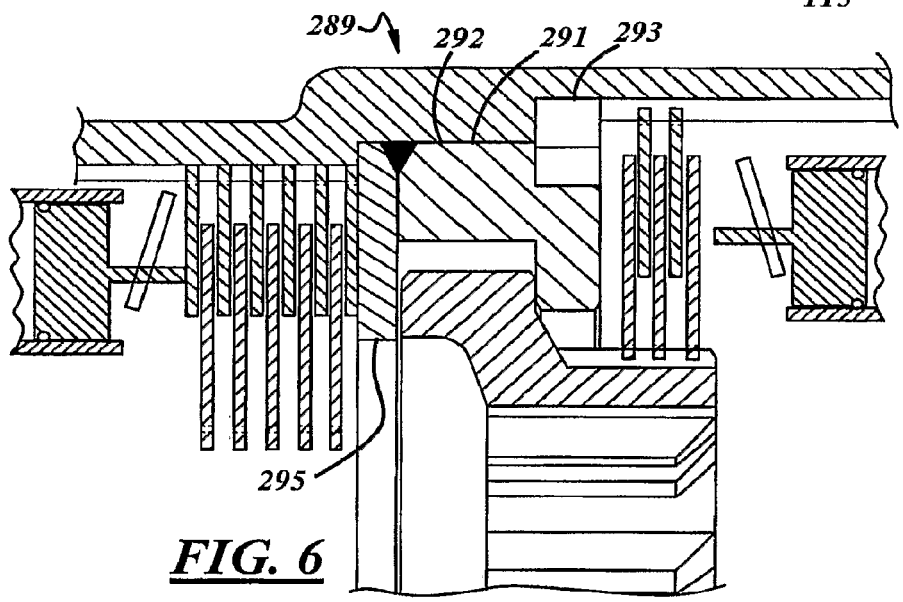
FIG. 6 is view similar to that of FIG. 1 of still another alternative embodiment of a one-way clutch according to the present invention.
Figure 7:
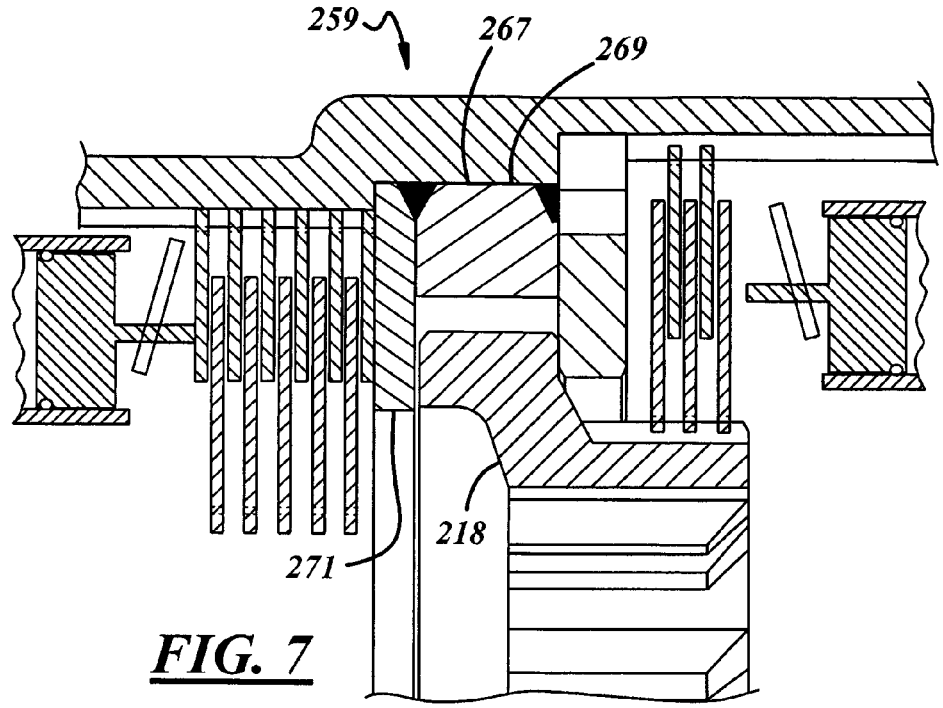
FIG. 7 is a view similar to that of FIG. 1 of still another alternative embodiment one-way clutch of the present invention.

FIG. 7 provides a transmission arrangement 259 providing a one way clutch 267 having a first race 269 with a first backing plate 271 which is connected thereto by brazing. The other portions of the one way clutch 267 are similar or identical to that previously explained in relationship to the one way clutch 207. FIG. 6 provides a transmission arrangement 289 wherein the one way clutch 291 has an outer race 292 with integrally connected second backing plate 293 which has a larger outer diameter than the first backing plate 295. The other aspects of the one way clutch 291 are essentially similar or identical to that previously described in relationship to the one way clutch 207.

While preferred embodiments of the present invention have been disclosed, it is to be understood it has been described by way of example only, and various modifications can be made without departing from the spirit and scope of the invention as it is encompassed in the following claims.

The invention claimed is:

1. A one-way clutch comprising:
   a first outer race, said first race being connected with a friction pack drum having serrations to allow said friction pack drum to be non-rotatively mounted with a transmission casing;
   a second race having relative rotational movement with said first race;
   a locking mechanism positioned between said first race and said second race to allow relative rotational movement between said races in one direction only; and
   first and second backing plates both axially fixably connected with said first race, one of said backing plates being integrally formed as one piece with said friction pack drum.

2. A one-way clutch as described in claim 1 wherein one of said backing plates is connected to said first race by a technique taken from the group of welding, brazing, bonding, adhesive, bolting, threaded fastening, swedging, interference fitting and serrating.

3. A one-way clutch as described in claim 1 wherein said locking mechanism is taken from the group of sprag, ratcheted and roller type locking mechanisms.

4. A one-way clutch as described in claim 1 wherein said integral backing plate is on a common side of said first race with said friction pack drum.

5. A one-way clutch as described in claim 1 wherein said integral backing plate is on an opposite side of said first race than said friction pack drum.

6. A transmission arrangement comprising:
   a body with an interior boundary having sequentially larger shouldered first, second and third diameters;
   a one way clutch having a first outer race fixed with respect to said interior boundary, a second inner race having unidirectional relative rotational movement with respect to said first race;
   a locking mechanism allowing only unidirectional relative rotational movement of said second race;
   first and second backing plates connected with said first race, said first backing plate extending to said second diameter and said second backing plate extending to said third diameter; and
   first and second sets of axial movable annular friction members adjacent respective first and second backing plates, said first set of friction members extending toward said first diameter and said second set of friction members extending toward said third diameter.

7. A method of assembling a transmission comprising:
   providing an interior boundary with serrations;
   providing a position for a first friction pack within said interior boundary; and
   installing adjacent to said position for said friction pack within said interior boundary a clutch providing an outer race with an axially fixably connected first backing plate for said friction pack, said outer race being connected with an axially fixably connected second backing plate and a drum with serrations on an outer surface for non-rotative mounting within said interior boundary, said drum being integrally formed as one piece with one of said backing plates, said clutch having an inner race with a spline, said inner race having unidirectional relative movement with said outer race by a locking mechanism located between said inner and outer races, said drum and said inner race spline mounting a second friction pack.

8. A one-way clutch as described in claim 1 wherein said friction pack drum mounts a friction pack including more than three discs.

* * * * *